United States Patent [19]

Zuefle et al.

[11] Patent Number: 5,645,691
[45] Date of Patent: Jul. 8, 1997

[54] EXTENDED NIP PRESS ROLL FOR A PAPERMAKING MACHINE

[75] Inventors: Thomas Zuefle; Christian Schiel, both of Heidenheim; Karl Steiner, Herbrechtingen, all of Germany

[73] Assignee: Voith Sulzer Papiermaschinen, Germany

[21] Appl. No.: 425,818

[22] Filed: Apr. 20, 1995

[30] Foreign Application Priority Data

May 4, 1994 [DE] Germany ............... 44 15 645.6

[51] Int. Cl.$^6$ ............................................. O21F 3/08
[52] U.S. Cl. .................. 162/358.3; 162/272; 162/361; 492/7
[58] Field of Search ............... 162/358.3, 361, 162/272; 492/7

[56] References Cited

U.S. PATENT DOCUMENTS

| | | |
|---|---|---|
| Re. 33,034 | 8/1989 | Schiel et al. . |
| 4,228,571 | 10/1980 | Biondetti ............................ 492/7 |
| 4,563,245 | 1/1986 | Wanke et al. ...................... 162/358.3 |
| 4,584,059 | 4/1986 | Schiel et al. ...................... 162/361 |
| 4,625,376 | 12/1986 | Schiel et al. ...................... 492/7 |
| 4,673,461 | 6/1987 | Roerig et al. ..................... 162/358.3 |
| 4,923,570 | 5/1990 | Steiner et al. .................... 162/358.3 |
| 5,338,279 | 8/1994 | Schiel ............................ 492/7 |

FOREIGN PATENT DOCUMENTS

| | | |
|---|---|---|
| 27 59 035 | 10/1979 | Germany . |
| 33 11 998 | 4/1984 | Germany . |
| 35 01 635 | 7/1986 | Germany . |
| 41 23 115 | 1/1993 | Germany . |
| 2182367 | 5/1987 | United Kingdom ............... 162/358.3 |

*Primary Examiner*—Karen M. Hastings
*Attorney, Agent, or Firm*—Pretty, Schroeder & Poplawski

[57] ABSTRACT

The invention provides a roll for a papermaking machine, comprising at least one strip element which extends substantially in the axial direction of the roll and which is supported, substantially against radial forces, by a plurality of supporting elements. The supporting elements comprise adjusting means by means of which a predetermined profile of the bending curve of the strip element can be adjusted in response to a given outer load. When the roll is configured as a shoe press roll, then the strip element may also be directly coupled with the press shoe. It is possible in this way, in the case of shoe press rolls, to ensure safe development of a hydrodynamic lubricating wedge and, in the case of other rolls, to adjust a desired profile of the bending curve of the strip element, under a given outer load.

16 Claims, 7 Drawing Sheets

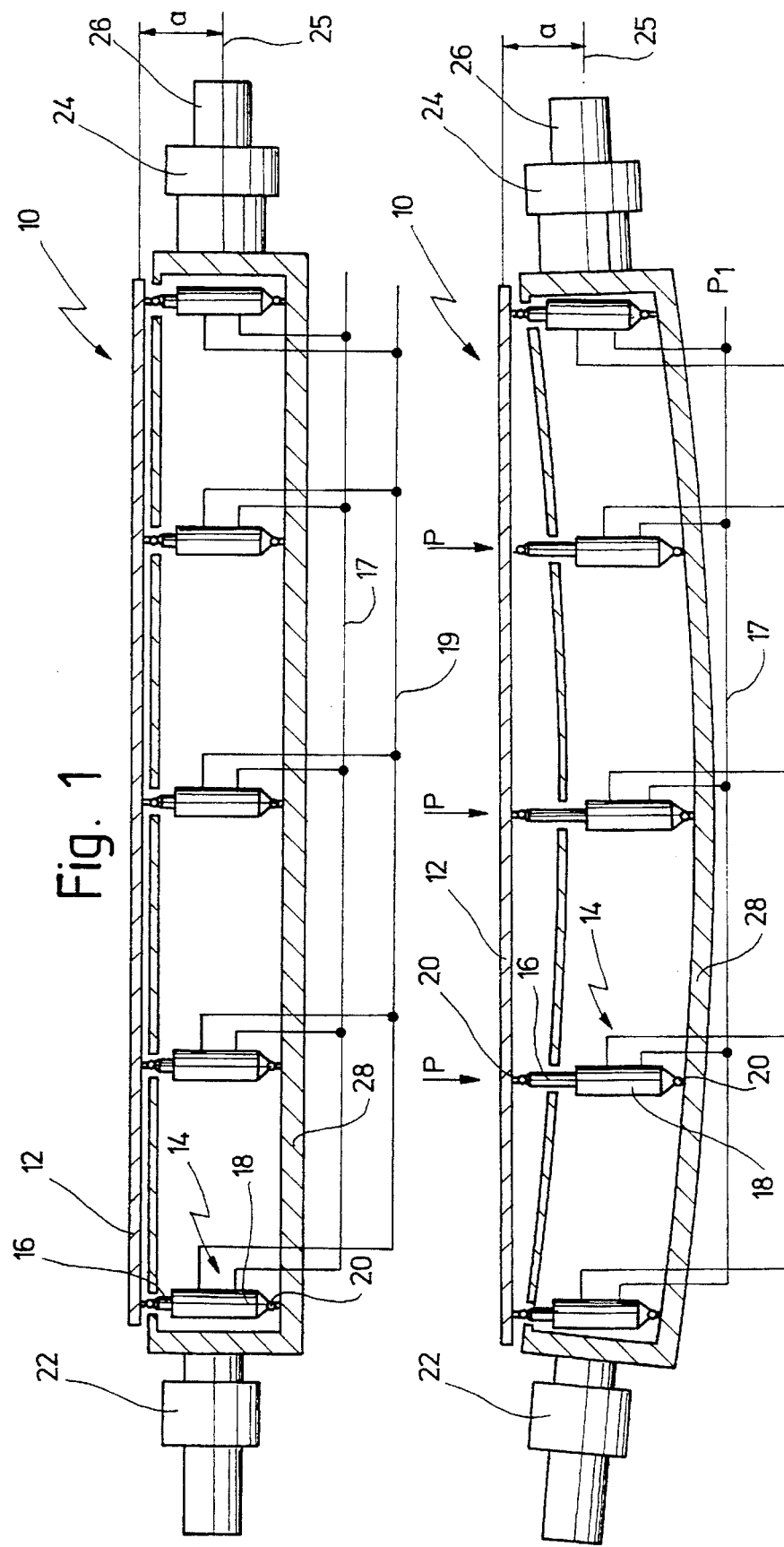

EXTENDED NIP PRESS ROLL FOR A PAPERMAKING MACHINE

BACKGROUND OF THE INVENTION

The present invention relates to a roll for a papermaking machine having at least one strip element extending substantially in the axial direction of the roll, which is supported, substantially against radial forces, by a plurality of supporting elements.

A roll of this kind has been known from U.S. Pat. No. 4,584,059. The known arrangement is a shoe press roll where a press blanket is guided on guide strips that are supported by spring elements on an inner stiff carrying body so as to ensure a non-bending behavior of the press blanket in the axial direction. It has been found to be a disadvantage of this design that configuring the inner carrying body as a stiff element requires much input and is, thus, expensive especially in the case of press rolls of great width. In addition, when the carrying body bends, its studs assume an inclined position so that the carrying body moves away from the back-up roll at its ends, too. This, too, would result in an undesirable vertical displacement of the sliding surface of the strip element relative to the sliding surface of the press shoe, especially in the presence of high line loads or in the case of long studs. Further, one can also imagine applications where it is by no means desired to have a straight profile of the guide strips, but the aim is rather to adjust a predetermined bending curve of the guide strip in response to an outer load.

In the case of shoe press rolls according to the aforementioned U.S. Pat. No. 4,584,059, the press blanket revolves about a stationary carrying body, and if the press blanket revolves at a sufficiently high speed a hydrodynamic lubrication is said to be achieved. In certain cases, especially when no space is available for a felt guide roll on the infeed side of the shoe press, there is a risk that the felt, being under a certain tension in the longitudinal direction, may press the press blanket against the infeed area of the press shoe in such a way that under certain load conditions a hydrodynamic lubrication wedge cannot develop as required. This may lead to premature wear of the press blanket, due to insufficient lubrication. In addition, these conditions may result in considerable heating of the press blanket, increased power consumption and variations of the press parameters.

SUMMARY OF THE INVENTION

Now, it is the object of the present invention to provide a roll for a papermaking machine where a predetermined profile of the bending curve of the strip element can be adjusted in response to a given outer load acting on the roll. Further, it is an object of the invention to guarantee a sufficient hydrodynamic lubrication wedge for all operating conditions of a shoe press roll, if possible.

This object is achieved according to the invention by the fact that the supporting elements of a roll of the aforementioned kind comprise adjusting means by means of which a predetermined profile of the bending curve of the strip element and, preferably, its vertical position related to a back-up roll can be adjusted in response to a given outer load.

The object of the invention is thus fully achieved since it is now possible, according to the invention, to adjust a bending curve of a strip element at desire, independently of the deflection of the roll itself or the deflection of a carrying body provided in the roll. If desired, the vertical position of the strip element relative to the back-up roll can also be adjusted at desire. This enables the roll to be made less stiff, and arbitrary bending curves to be adjusted in response to a given outer load acting on the roll.

In the event some deflection and/or variation in distance between the back-up roll and the carrying body should be encountered with a shoe press roll, then the position of the guide element can be adapted in a suitable way in order to permit a press felt running about the shoe press roll to be optimally guided. At the same time it is ensured that a sufficient hydrodynamic lubrication wedge will at all times exist on the press shoe.

With the aid of the invention it is ensured that even in cases where the press shoe suffers some deflection, for example when the back-up roll (arranged opposite the roll according to the invention) deflects in the pressing direction of the press shoe, the press shoe will follow that deflection and the strip element will also be subjected to a deflection adapted to the deflection of the press shoe.

In addition, the strip element according to the invention can be used in a plurality of other applications where the point is to adjust a given deflection of the strip element. So, the strip element according to the invention may be used with advantage also in deflection adjusting rolls or suction rolls, in particular also in suction press rolls.

It is understood that a plurality of strip elements may be provided in one roll. And it is also possible to use one or more strip elements for sealing the transition between sectors of different pressures.

According to an advantageous further development of the invention, the roll according to the invention is configured as a press roll for a papermaking machine having a press nip formed between two press elements, with the strip element arranged outside that nip, the roll comprising an inner carrying body that is intended for taking up external forces and on which the supporting elements are supported.

This design relates to the before-mentioned U.S. Pat. 4,584,059 where the strip element is arranged in a press roll outside the pressing plane. While it is generally known in connection with deflection adjusting rolls (compare DE 4,123,115 corresponding to U.S. Pat. No. 5,338,279) to adjust a desired deflection of a press blanket by means of a hydraulic chamber, this feature relates exclusively to the area of the press nip as such in order to enable extraordinarily high line forces to be taken up in the nip in the case of deflection adjusting rolls of great width, without the need to make use of expensive bearings for rotatably seating the entire roll. Instead, only the roller shell is rotatably supported, and the main portion of the pressing force is directly and hydraulically supported by a stationary yoke.

According to the invention it is now proposed to arrange a strip element in an area outside the press nip, which strip element is coupled with adjusting means for the purpose of adjusting a predetermined profile of the bending curve of the strip element under the action of an external load.

According to a further advantageous development of the invention, at least one supporting element comprises hydraulic or pneumatic adjusting elements.

In the case of this design, the bending curve of the strip element can be adjusted in a particularly simple way, it being especially easy to allow for different parameters via a corresponding hydraulic or pneumatic circuit, in order to adjust a desirable bending profile.

In the simplest of all cases, a supporting element comprises a one-direction fluid cylinder to which a return spring element is assigned.

Alternatively, the spring element may of course also be omitted, and instead a two-direction fluid cylinder may be used.

A still further simplified design can be achieved according to the invention if the supporting elements comprise spring elements having different spring constants that are tuned to a specific deflection of the roll under load, in order to adjust a predetermined profile of the bending curve of the strip element.

If the bending curve of the strip element need not be adjustable, or if such adjustability is not desired during operation, the system can be still further simplified as it is then possible to do without any controllable hydraulic and pneumatic elements. It is only necessary in this case to adapt the spring constants of the respective spring elements to the outer load in order to achieve a desired bending curve of the strip element under a given load.

Alternatively, this result can be achieved by the utilization of spring elements with identical spring constants to which pistons of different piston surfaces are assigned, that are driven by application of the same pressure.

According to another embodiment of the invention, at least one supporting element comprises a motor-driven servo-drive.

This feature provides the advantage that an especially sensitive adjustment of the desired bending curve can be achieved, for example by the use of a motor drive having a corresponding reduction ratio, maybe in combination with a threaded spindle of a correspondingly small pitch. In addition, different factors of influence can be allowed for by the control of the motor-driven servo-drives, simply by selecting a suitable electric control system.

As the distance between the carrying strip and the carrying body, which normally deflects under load, varies, the distance of the individual supporting elements relative to each other will vary, too, so that according to an advantageous further development of the invention the adjusting means are connected with the carrying bodies by articulations.

According to a further development of the invention it is provided that the strip element is subdivided axially into a plurality of strip element sections connected one to the other via articulations.

It is thus possible, in an advantageous manner, to mutually decouple individual axial areas of the strip element if the latter should be subjected, for example, to heavily varying loads. This permits a more precise control of individual axial sections of the strip element as it considerably reduces the mutual interference of neighboring axial areas during adjustment of the supporting elements, as normally encountered in the case of a one-piece design.

The articulations between the different strip element sections may also be obtained in this case by reductions in cross-section in the form of grooves, or the like, so that the reduced bending resistance in the area of the reduced cross-section finally has the effect of an articulation.

If the roll according to the invention is configured as a shoe press roll comprising a press shoe arranged for being hydraulically pressed against a back-up roll, with a press blanket being guided about the press shoe and revolving on a lubricant, then it is especially advantageous to arrange the strip element immediately before the nip, viewed in the direction of movement of the web.

As has been mentioned before, it is possible in this way, in spite of the pressure exerted on the press blanket by a felt—which pressure results from the longitudinal tension in the felt and the roll wrap—to guarantee the development of a sufficient hydrodynamic lubricating wedge.

According to an additional further improvement of this design, the strip element may comprise means for removing excessive lubricant by suction.

Such a design is applied with advantage when the roll according to the invention and the press shoe are arranged above the back-up roll.

Further, in connection with a roll for a papermaking machine, comprising a nip formed between two rolls and a press shoe arranged for being hydraulically pressed against a back-up roll, with a press blanket revolving over the said press shoe, the roll comprising at least one strip element arranged substantially in axial direction outside the press nip, the object of the invention is achieved by the fact that the strip element is fixed on the press shoe.

It is thus rendered possible—if a press shoe deflects under an outer load —to ensure, even without the use of adjusting means, that the strip element will always directly follow the deflection of the press shoe so that it will at all times be guaranteed that a sufficient hydrodynamic lubricating wedge is maintained even if the deflection of the press shoe should vary, because by maintaining the parallel alignment of the strip element relative to the press shoe any interruption or squeezing-off of the lubricating wedge will be prevented.

According to a convenient further development of this embodiment, the strip element is arranged immediately before the press shoe, viewed in the direction of movement of the web.

According to an additional further development of this embodiment, the strip element is formed integrally with the press shoe.

The strip element may be configured in this case for example as an extension of the press shoe toward its infeed side, and a separation may be provided between the strip element and the press shoe, for example in the form of an undercut provided at the end of the strip element. In addition, lubricant may be supplied via an axial or radial channel to the pocket so formed between the strip element and the press shoe, if this should be necessary.

This can be achieved, according to a further development of the invention, by providing longitudinal grooves, preferably 0.2 to 1 mm deep, in the surface of the strip element in order to improve the flow of the lubricant in the direction of movement of the web.

It is understood that the features mentioned above and those yet to be explained below can be used not only in the respective combinations indicated, but also in other combinations or in isolation, without leaving the scope of the present invention.

SHORT DESCRIPTION OF THE DRAWINGS

Further features and advantages will become apparent from the following description of certain preferred embodiments of the invention given by reference to the drawings in which:

FIG. 1 shows a diagrammatic, very simplified representation of a first embodiment of a roll according to the invention, in unloaded condition;

FIG. 2 shows the embodiment according to FIG. 1, loaded by a line force P;

DETAILED DESCRIPTION OF THE PREFERRED EMBODIMENTS

Figure 3:
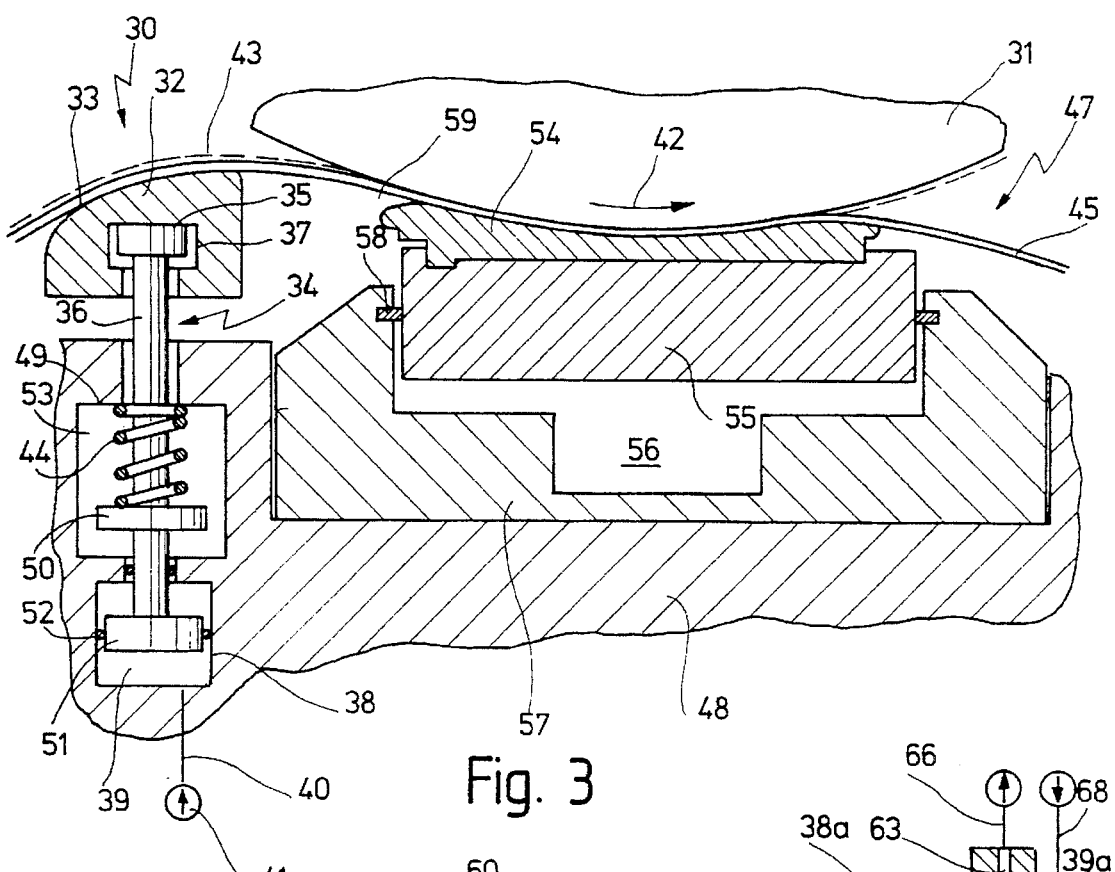
FIG. 3 shows a detail of a second embodiment of a roll according to the invention, designed as a shoe press roll, in the area of the nip.

In FIGS. 1 and 2, a first embodiment of a roll according to the invention is generally indicated by reference numeral 10.

The roll comprises a stationary carrying body 28, whose two ends are designed as stationary journals 26 that are supported on their one end in a fixed bearing 24 and on their other end in a floating bearing 22. On the carrying body 28, a roller shell is mounted in rotating relationship (not shown).

Arranged on the carrying body 28, in parallel to the roller shell, is a strip element 12 which is intended to remain in parallel alignment with the roll when the roll 10 is loaded by a line force in axial direction, but to assume a desired bending profile in certain given applications. Further, the height of the strip element 12 relative to the back-up roll is to be adjustable.

The strip element 12 is coupled with adjusting means—being indicated generally by reference numeral 14—via a plurality of supporting elements, that are fixed in position via articulations 20. In the case illustrated in the drawing, the adjusting means are configured as two-direction hydraulic cylinders that can be extended via a pressure line 17 or retracted via a pressure line 19.

While in FIG. 1 both the carrying body 28 and the strip element 12 are unloaded and, thus, no deflection of the strip element 12 occurs, so that the adjusting means 14 can remain pressureless and the strip element 12 is retained in its final position, the roll 10 as shown in FIG. 2 is loaded by a line force P.

Thus, the carrying body 28 suffers a certain deflection, as indicated diagrammatically in FIG. 2.

In the illustrated case, the pressure line 17 of the adjusting means 14 is supplied with a pressure P1 that acts on the adjusting means 14 so that the force resulting from a line force P is compensated by the counteracting force exerted by the adjusting means 14 and the strip element is not deflected so that the distance a between the strip element 12 and an axis 25 extending through the centers of the bearings 22, 24 remains constant.

When the line force P drops again, falling to zero, the carrying body 28 is no longer deflected and the pressure line 17 can remain pressureless, while a lower pressure is applied to the pressure line 19 in order to retract the piston rods 26 into the hydraulic cylinders 18 so that the strip element 12 returns to its neutral position as illustrated in FIG. 1.

FIGS. 1 to 2 illustrate the most common application for the alignment of the strip element 12 to a desired bending curve under load. It is understood that, starting out from this design, the most different applications can be imagined. For example, the strip element may be used for supporting a press blanket guided about the roll, for stripping off liquids, for extracting liquids or applying them uniformly over the width of the roll, and for sealing the transition between sectors of different pressures on the roll, for example in the case of a shoe press roll, a suction roll or a deflection adjusting roll. Some of these applications will be described in more detail hereafter with reference to the other Figures.

FIG. 3 shows one embodiment of the roll according to the invention in the form of a shoe press roll, indicated generally by reference numeral 30.

The shoe press roll 30 comprises a press shoe 54 that is held on a supporting element 55 and can be urged against an upper back-up roll 31 by a hydraulic pressure prevailing in the pressure chamber 56 between the supporting element 55 and a lower shoe bed 57. The pressure chamber 56 is shut off by means of a gasket 58. A press blanket 45 guided over the press shoe 54 revolves in the conventional way about a stationary carrying body of the roll 30, being hydrodynamically lubricated by a lubricating film on its side facing the press shoe 54. The press blanket 45 is sealed off for this purpose laterally in a manner known as such (compare DE 3,501,635, corresponding to U.S. Pat. No. 4,625,376).

A felt that runs through the press nip 47 formed between the press shoe 54 and the back-up roll 31 is indicated only diagrammatically by reference numeral 43, and is guided on a pulp web (not shown) from which water is to be extracted.

The pulp web thus moves together with the press blanket 45 and the felt 43 in the direction of movement 42 through the press nip 47. During this movement, a lubricating nip 59 forms on the infeed end of the press shoe 54, through which a lubricant enters the interspace formed between the press blanket 45 and the press shoe 54. If the press blanket 45 moves at a sufficiently high speed, this gives rise to the formation of a hydrodynamic lubricating wedge, starting at the lubricating nip 59 on the infeed side of the press shoe, so that the press blanket 45 revolves in the press nip 47 substantially free from friction, in spite of the high load exerted on the press blanket in the radial direction of the roll 30.

It is a requirement for the formation of a sufficient hydrodynamic lubricating wedge that sufficient lubricant is permitted to enter the interspace between the press blanket 45 and the press shoe 54 through the lubricating nip 59.

If, however, the press blanket 45 is subjected to high radial loads already before it enters the press nip 47, which loads are due in particular to the longitudinal tension in the felt 43 and the press blanket wrapping around the nose of the press shoe 54, then this may lead to the lubricating nip 59 becoming narrower and, in the extreme case, to the press blanket 45 being squeezed off on the infeed side of the press shoe 54 so that a sufficient hydrodynamic lubrication is no longer ensured. Such a case may occur especially when no felt guide roll can be arranged on the infeed side of the shoe press roll because of space restraints.

In order to exclude this risk, a strip element 32 is arranged immediately before the press shoe 54, in the direction of movement 42, whose surface 33 serves to guide the press blanket 45. The strip element 32 extends in the axial direction of the roll 30 and is supported on the carrying body 48 of the roll by a plurality of supporting elements, that are provided with adjusting means and are indicated generally by reference numeral 34, and can be adapted to the load acting on the press blanket 45 in order to adjust a desired bending curve of the strip element 32 and, thus, to ensure an optimum hydrodynamic lubrication for the press blanket.

To this end, a plurality of hydraulically actuated piston rods 36, whose ends take the form of cylindrical rams 35, engage a longitudinal groove 37 provided in the strip element 32 in order to support the strip element 32 in the desired way. In FIG. 3, i.e. the cross-sectional representation of FIG. 3, of course only the one adjusting means 34 that lies in the sectional plane can be seen, together with the respective piston rod 36 and the hydraulic means.

The piston rod 36 extends through a cylindrical opening 53 and another cylindrical opening 38 in the carrying body 48. In the upper cylindrical opening 53, one can see between its upper end face and a flange 50 rigidly fixed on the piston rod 36, a spring element 44 through which the piston rod 36 is biased in downward direction.

The lower end of the piston rod 36 carries a cylindrical piston 51 which is in sealing contact with the wall of the lower cylindrical opening 38, via a gasket 52. As a result of this arrangement, a sealed pressure chamber 39 is created in the lower area of the cylindrical hollow space 38, to which chamber pressure can be applied from a pressure source 41, via a pressure line 40, in order to urge the piston rod 36 in upward direction against the restoring force of the spring element 44.

The pressure in the pressure chamber 39 is preferably controlled in a manner to ensure that the strip element 32 will at all times adapt itself to the shape of the press shoe 54 and, thus, guarantee optimum guiding conditions for the press blanket 45 on the infeed side of the press shoe 54, so as to ensure satisfactory hydrodynamic lubrication. The shape of the press shoe 54 and, thus, the profile of the strip element 32 depend on whether or not the back-up roll 31 deflects.

In addition to the line force acting in the press nip 47, other factors of influence, such as the revolving speed of the press blanket 45, the temperature, and the like, can be allowed for with the aid of an electronic control in order to ensure optimum guiding conditions for the press blanket 45 on the infeed side of the press shoe 54.

In some cases it is possible to supply a pressure agent of the same pressure and from the same pressure source simultaneously to the pressure chambers 39 and 56, so that the press shoe 54 and the supporting element 55, respectively, and the strip 32 will move simultaneously from their neutral position into their working positions illustrated in the drawing. On the other hand, supplying pressure to the pressure chambers 39 independently of the pressure prevailing in the pressure chamber 56 provides the advantage that the strip 32 is capable of taking up a load that may result, for example, from the longitudinal tension of the felt 43, already at a time when no pressure, or not the full pressure, prevails in the pressure chamber 56, as may be the case for example during the start-up phase of the papermaking machine.

Figure 4:
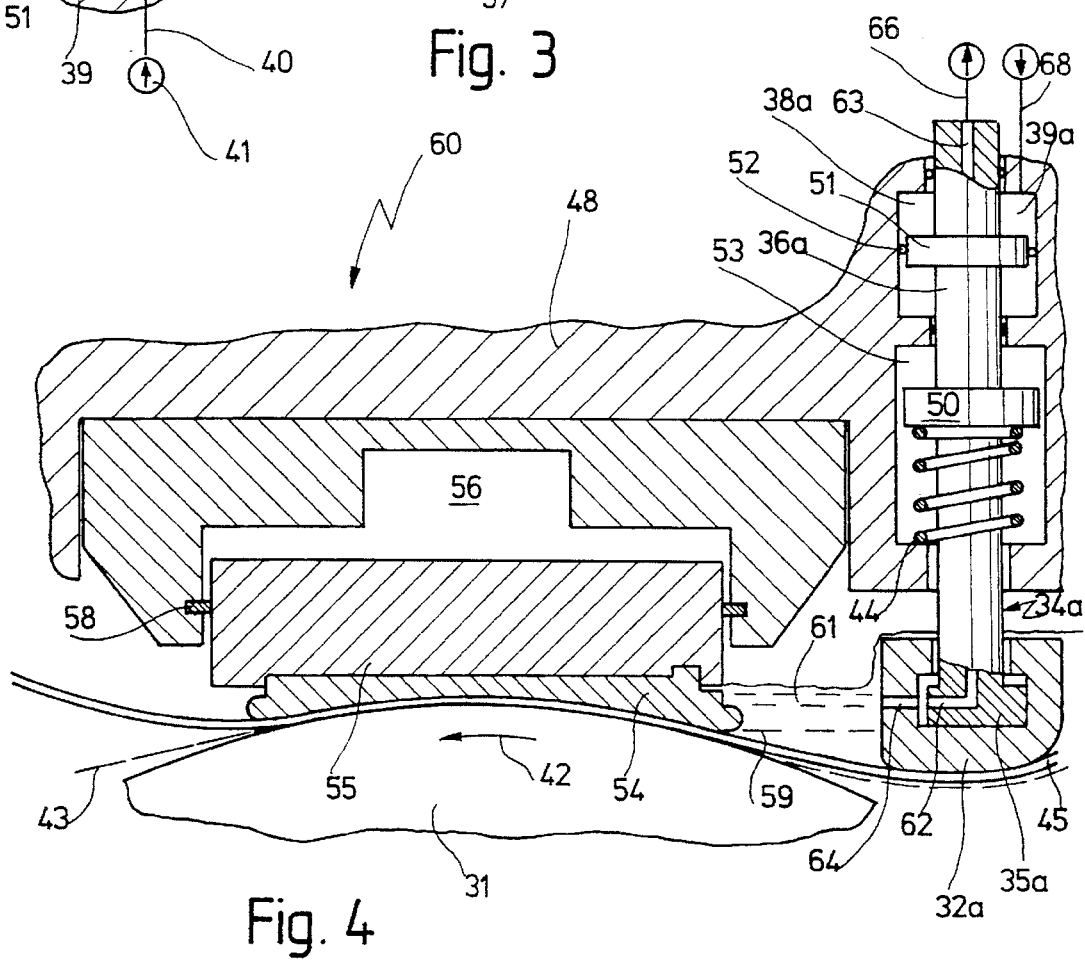
FIG. 4 shows another design of a roll according to the invention, modified relative to the design shown in FIG. 3 insofar as the shoe press roll is arranged in upper position.

In FIG. 4, a design of the roll according to the invention, slightly modified compared with that illustrated in FIG. 3, is indicated generally by reference numeral 60. The roll 60, which in this case also takes the form of a shoe press roll, is in this case arranged on top of the back-up roll 31.

Any excessive lubricant 61 on the infeed side of the press shoe 54 can be additionally extracted through a connected suction line 66, via a suction opening 64 in the strip element 32a and a suction channel 62, 63 running through the piston rod 36a of the adjusting means 34a. Here again, pressure may be applied to the pressure chamber 39a formed in the cylindrical hollow space 38a via a pressure line 68 in order to extend the piston 51, together with the piston rod 36a, against the force of the spring element 44, in order to support the strip element 32a.

For the rest, the structure of the carrying strip 32a and of the adjusting means 34a is completely identical to that described before with reference to FIG. 3, so that identical parts have been identified by the same reference numerals.

Figure 5:
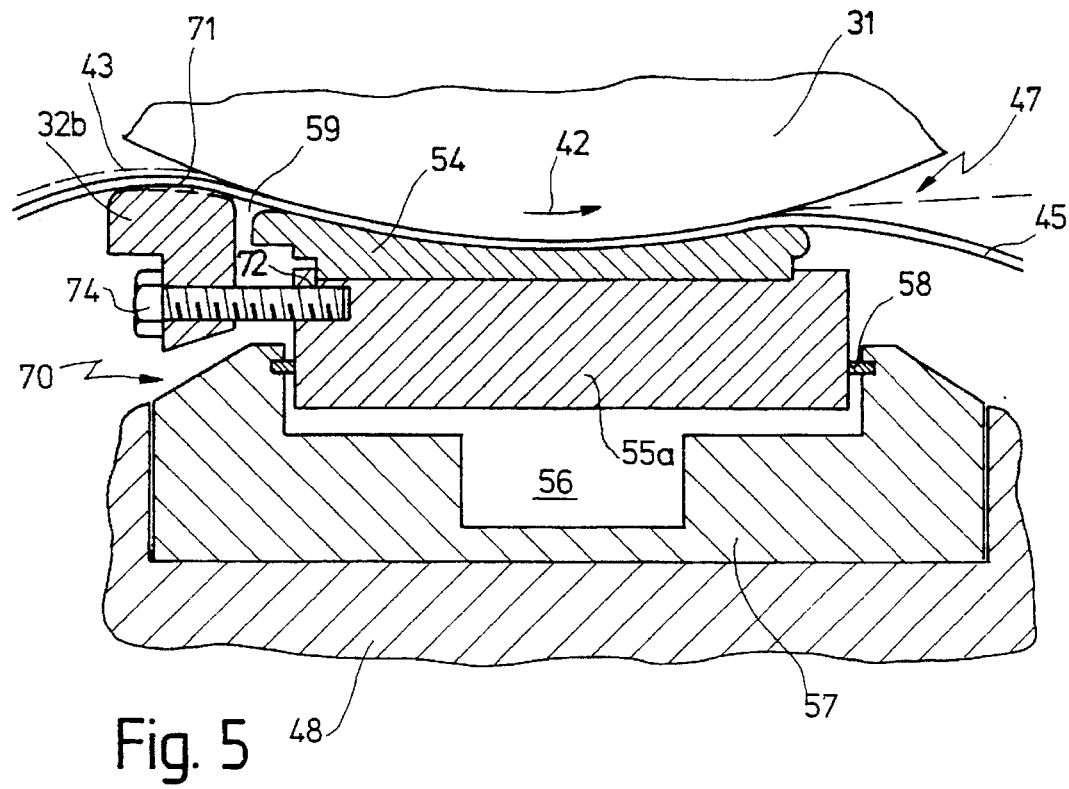
FIG. 5 shows another design according to the invention, slightly modified relative to the design according to FIG. 3.

Another modification of a roll according to the invention is generally indicated by reference numeral 70 in FIG. 5.

Here again, the system consists of a shoe press roll with a press shoe 54 that can be hydraulically urged against a back-up roll 31 arranged on top. As a modification relative to the embodiments described before, a strip element 32b is arranged on the infeed side of the press shoe 54 and rigidly connected with the press shoe 54, namely by being fixed by means of screws 74 in threaded bores 72 of the supporting element 55a arranged beneath the press shoe 54.

This embodiment distinguishes itself by the fact that it is considerably simpler than the designs described before with reference to FIGS. 3 and 4, as in this case no hydraulic adjusting elements, and corresponding controls, are required. Given the fact that the strip element 32b is subjected to substantially the same deflection as the press shoe 54 itself, due to its rigid connection with the supporting element 55a, perfect guiding conditions are ensured for the press blanket 45 on the infeed side of the press shoe 54, without any additional adjusting elements, so that here, too, good hydrodynamic lubrication is achieved.

In addition, the strip element 32b may be provided with longitudinal grooves 71 extending in the direction of movement of the web along the strip element 32b on the surface 33b facing the back-up roll 31, in order to further improve the oil lubrication in this area. Preferably, the depth of the longitudinal grooves 71 is between 0.2 and 1 mm.

Figure 6:
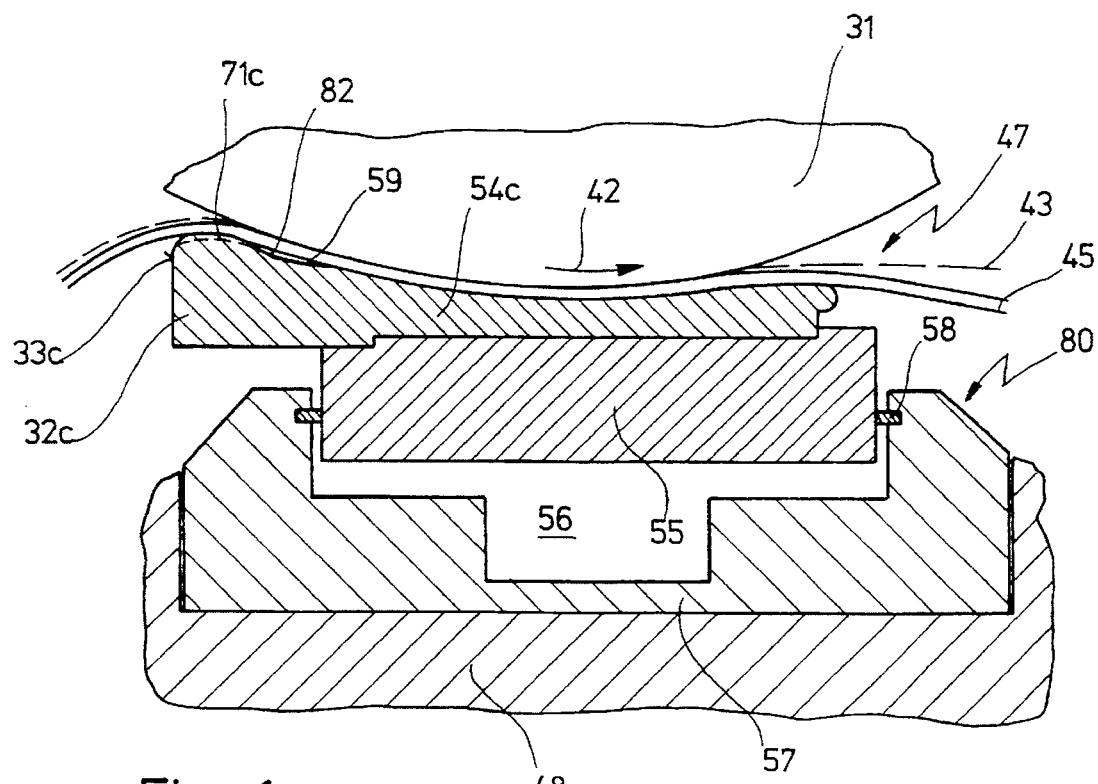
FIG. 6 shows another modification of the design according to FIG. 5.

A further modification of the roll 70 described in connection with FIG. 5 is illustrated in FIG. 6 and indicated generally by reference numeral 80.

The strip element 32c is in this case no longer configured as an independent strip element fixed on the press shoe, but is instead formed integrally with the press shoe 54c.

Thus, the strip element 32c forms an extension of the press shoe 54c in a direction opposite to the direction of movement 42 of the web. The press blanket 45 is again guided over the strip element 32c, and the curved surface 33c of the strip element comprises an undercut 82 on the infeed side, in which the lubricating nip 59 between the press blanket 45 and the press shoe 54c can develop. If desired, additional lubricant may be introduced into this undercut 82, via lateral or radial channels, in order to improve the hydrodynamic lubrication. Again, longitudinal grooves 71c can be provided in the strip element 32c for this purpose.

Figure 7:
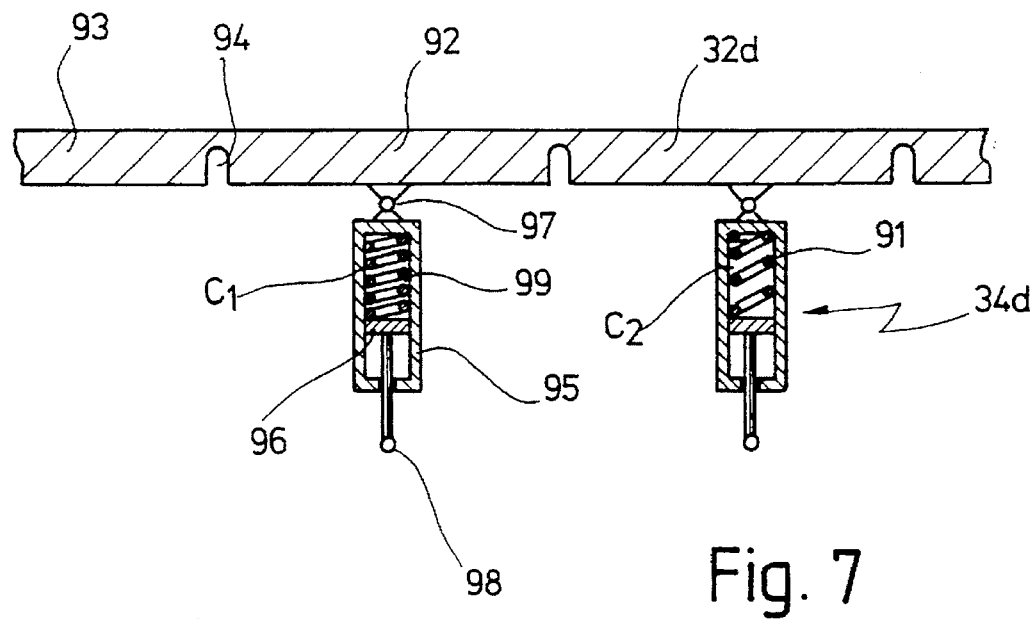
FIG. 7 shows another design of the strip element, consisting of separate articulated sections.
Figure 8:
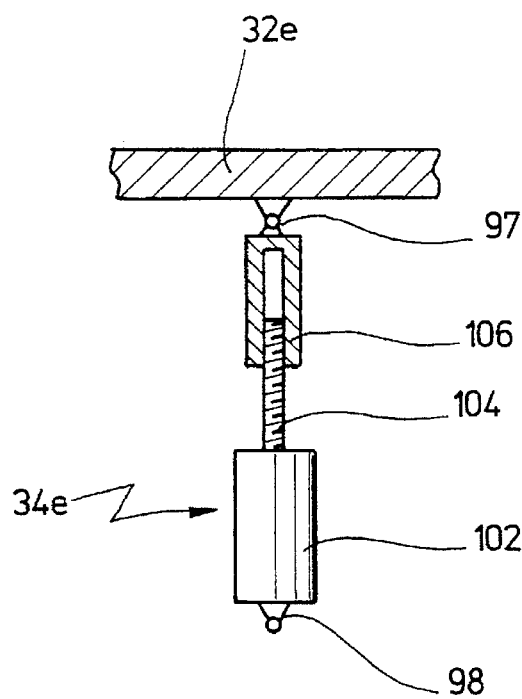
FIG. 8 shows another modification of an adjusting element, for adjusting the strip element according to the invention.

FIGS. 7 and 8 show further modifications of the invention.

In FIG. 7, the strip element 32d—viewed in the longitudinal direction—is subdivided into a plurality of strip element sections 92, 93, the different strip element sections 92, 93 being produced by transverse grooves 94 in the strip element 32d.

Due to the reduction in cross-section in the area of the grooves 94, one thus obtains the effect of articulations between the individual strip element sections 92, 93.

Each of the strip elements 92, 93 is again supported by an adjusting element, indicated generally by reference numeral 34d, which is fixed in position via articulations 97, 98.

The adjusting elements 34d comprise spring elements 91 and 99, respectively, that can be compressed in cylinders 95 by pistons 96 engaging the cylinders.

Adjusting the bending curve of the strip element 32d to a given outer load is rendered possible by suitable selection of the spring constants $C_1$, $C_2$ of the different adjusting means 34d.

It is thus possible, without the need to provide special adjusting means, to adjust a desired profile of the bending curve of the strip element 32d under load, by suitable selection of the spring constants. In particular, it is possible in this way (similar to the arrangement illustrated in FIGS. 1 and 2) to apply the same pressure to all cylinders 95.

In the case of the embodiment according to FIG. 8, the strip element 32e is supported via adjusting means 34e comprising a motor-driven servo-drive, for which purpose a threaded spindle 104 adapted for being adjusted within a threaded bore 106, can be driven by an electric motor 102.

Figure 9:
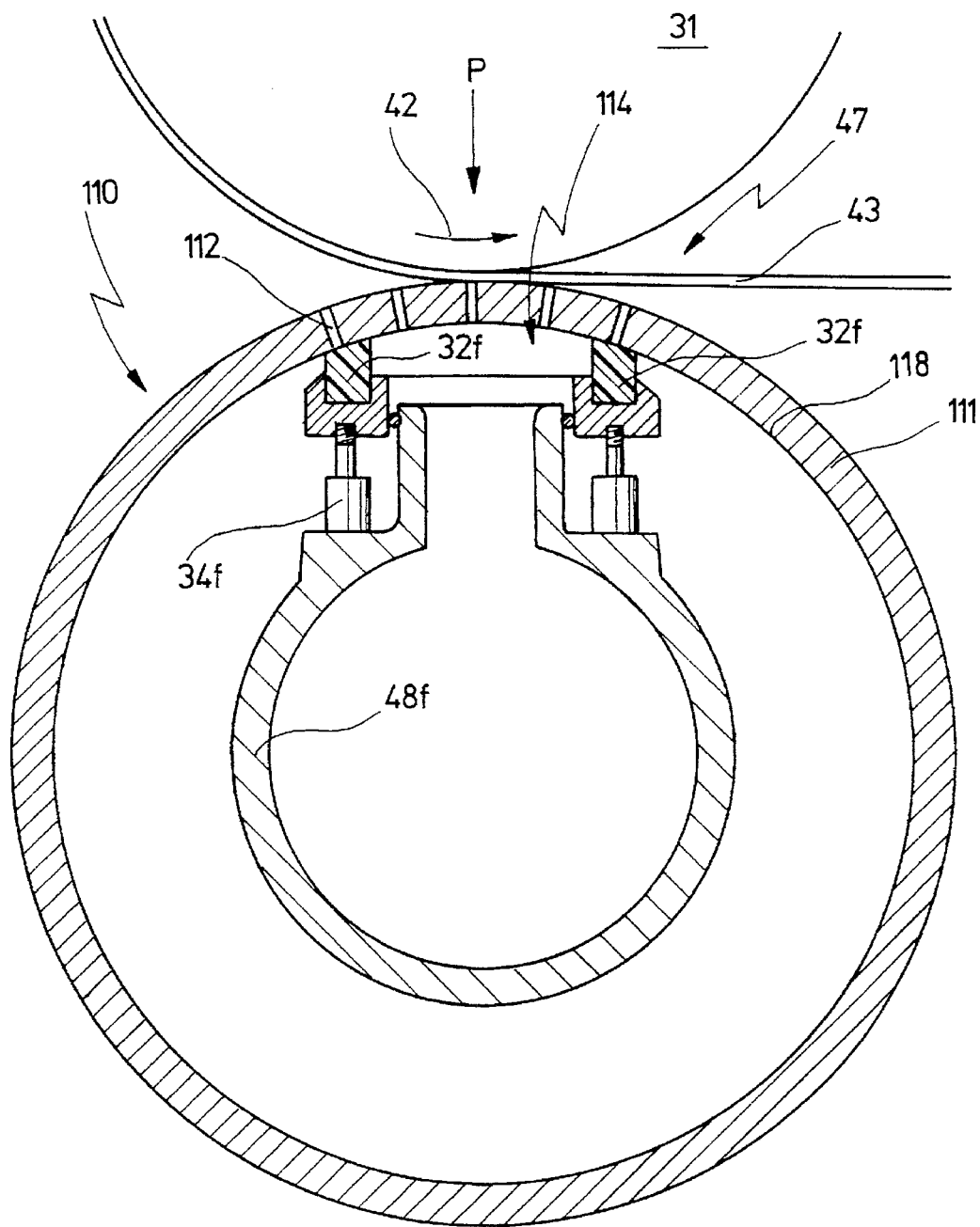
FIG. 9 shows a cross-section through another roll designed as a suction roll.

Another design of a roll according to the invention, in the form of a suction roll, is shown in FIG. 9 and indicated generally by reference numeral 110.

The shell 111 of the roll 100 is passed by suction openings 112 (illustrated only in the upper area, i.e. the area facing the back-up roll 31).

A suction zone 114 is sealed against the inner surface 118 of the shell 111 in the area of the press nip 47 by means of two strip elements 32f, each supported against the shell 111 via a plurality of adjusting means 34f, that are arranged one axially opposite to the other and one behind the other at the edges of the strip element 32f and that are supported on an inner, tubular carrying body 48f. As has been described before, the adjusting means 34f are designed as double-acting hydraulic cylinders or as one-direction hydraulic cylinders provided with restoring spring elements (not shown). Exhausting can be effected in the area of the suction zone 114.

Figure 10:
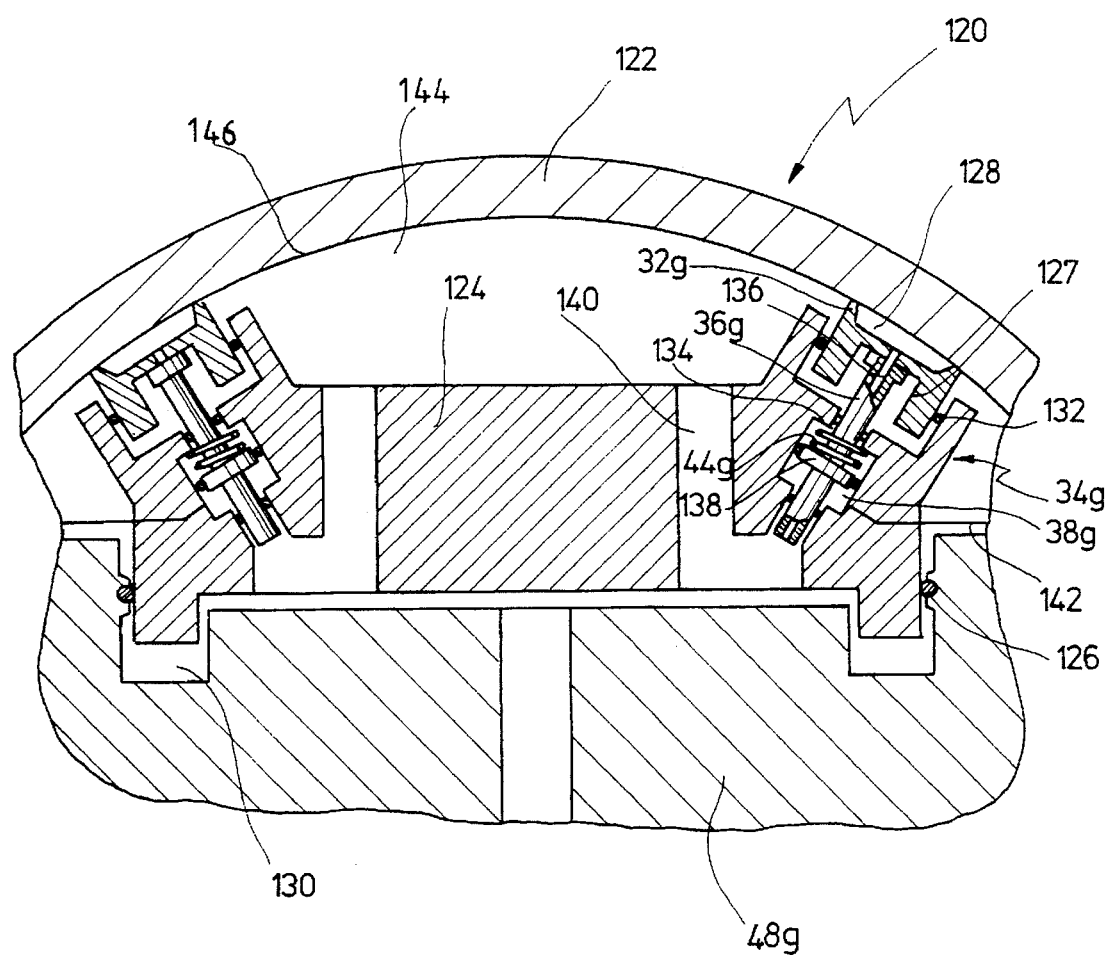
FIG. 10 shows a cross-section through a detail of another exemplary embodiment of the invention, designed as a deflection adjusting roll.

Another embodiment of the roll according to the invention in the form of a deflection adjusting roll is illustrated in FIG. 10 and indicated generally be reference numeral 120.

A stationary carrying body 48g is provided in a rotatably supported roller shell 122. Between the shell 122 and the carrying body 48g a pressure chamber 144 is formed which is connected to a hydraulic pressure source (not shown) for pressing the shell against an opposing press shoe of a shoe press roll (not shown). Seated in the carrying body 48g is a supporting element 124 that can be moved in vertical direction. The pressure chamber 144 is sealed off relative to the carrying body 48g by elastic seals 126. Further seals are provided at the end faces between the carrying body 48g and the supporting element 124. There are provided two strip elements 32g arranged according to the invention on both sides of the supporting element, each comprising pairs of mutually parallel sealing strips, between which hydrostatic pockets 128, being supplied with a pressure agent, are formed on the roller shell 122.

While conventionally the sealing strips are screwed directly to the supporting element 33 (compare DE 4,123, 115), the strip elements 32g according to the invention, together with their sealing strips, are now arranged to be pressed hydraulically against the inner surface 146 of the roller shell 122.

The strip elements 32g are provided for this purpose on their radially inward face with longitudinal grooves 127 that are engaged by the piston rods 36g of the adjusting means 34g. The piston rods are urged in radially inward direction by means of spring elements 44g retained between end faces of a cylindrical hollow space 38g formed by the pressing shoe 124, and of a piston 138 arranged on the piston rod 36g, respectively. In the cylindrical hollow spaces 38g, pressure chambers are formed between the pistons 138 and the lower end of the hollow spaces 38g, to which pressure can be applied via pressure lines 142 for urging the strip elements 32g in radially outward direction, toward the roller shell 122.

Hydrostatic pockets 128 can receive a pressure agent via passage channels 136 in the piston rods 36g, from passages 140 through which the pressure agent can flow from the pressure chamber 130 formed between the pressing shoe 124 and the carrying body 48g into the hydrostatic pockets 128 and into the area between the strip elements 32g, up to the roller shell 122.

Figure 11:
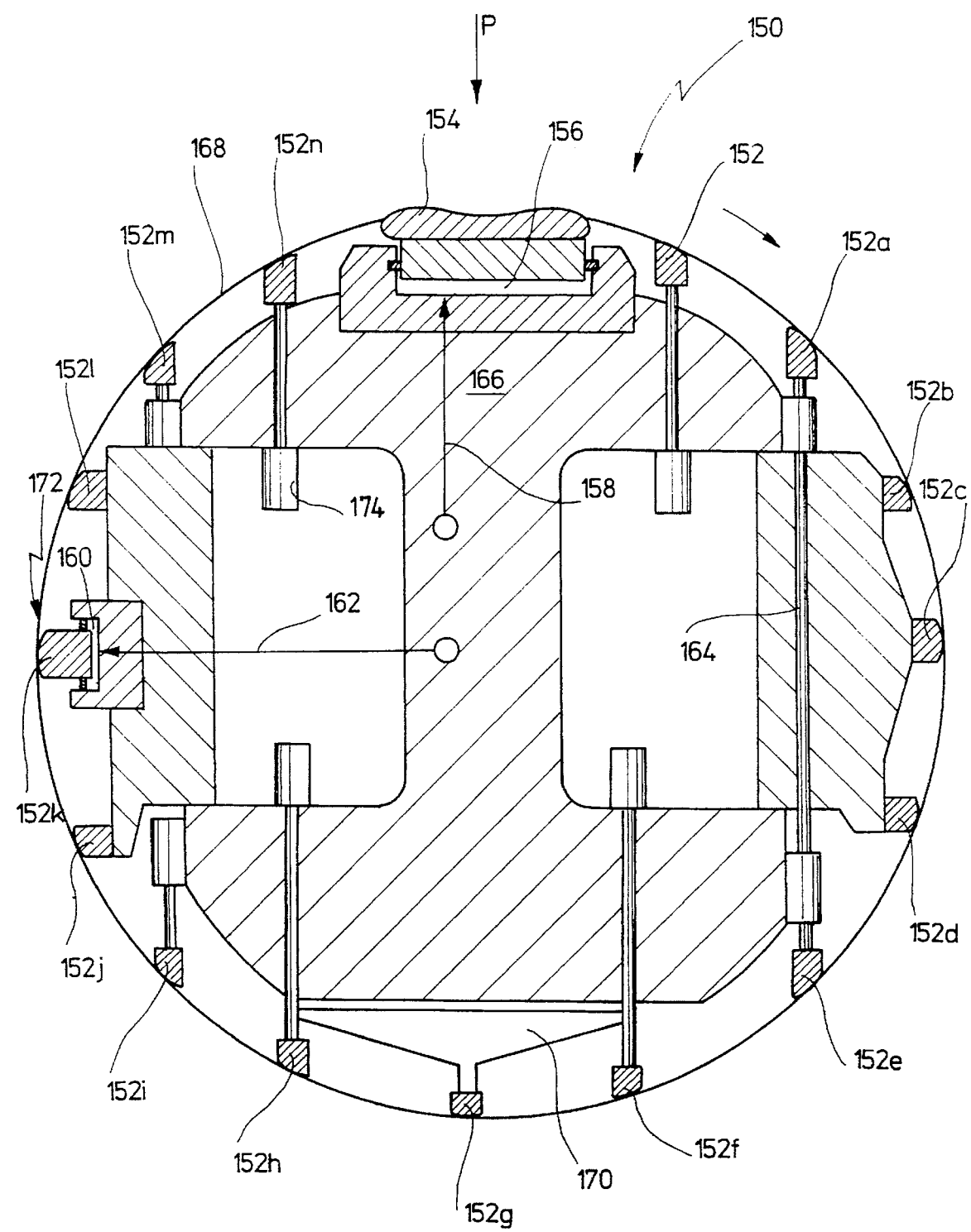
FIG. 11 shows a cross-sectional representation of a polygon-like arrangement of a plurality of strip elements about a carrying body that deflects under load.

FIG. 11 shows a roll, indicated generally by reference numeral 150, comprising a press blanket 168 revolving about polygonally arranged strip elements 152, 152a—n and a press shoe 154. Those strip elements 152, 152a, 152e, 152f, 152g, 152h, 152i, 152m, 152n, which are subjected to heavy radial deflection when the carrying body 166 deflects in the direction of the line force P, can be adjusted in position by adjusting means 174. The strip elements 152b, 152c, 152d, 152g, 152j, 152l are rigidly connected with the carrying body 166. One strip element 152k can be displaced in horizontal direction for the purpose of forming a second press nip 172, in which however lower pressures are encountered than at the press shoe 154, which latter is designed for high pressures. Similar to the press shoe 154, that can be urged against the back-up roll via a pressure chamber 156 to which pressure is applied from a hydraulic line 158, the strip element 152k can be hydraulically urged against a back-up roll or a tensioned web (not shown) by means of the pressure generated in a pressure chamber 160 via a hydraulic line 162. It is not necessary to provide separate adjusting means for each strip element. For example, the strip elements 152a and e may be coupled via a connection rod 164 so that one of the two adjusting means can be omitted.

FIG. 11 shows the press blanket 168 in unloaded condition. Under load, polygon-like sections of the press blanket 168 will be obtained, especially when slippage occurs between the press blanket and a back-up roll.

We claim:

1. Press roll for a shoe press for extracting liquid from a pulp web passing through a press nip of a paper making machine, comprising:

a press shoe supported hydraulically on a stationary carrying body of said shoe press roll for taking up press forces in the nip;

a press blanket passing over said press shoe for supporting said pulp web;

a plurality of strip elements for supporting said press blanket, arranged outside said press nip and extending substantially in an axial direction of said roll; and a plurality of supporting elements coupled to at least one of said strip elements for supporting said one strip element, said supporting elements engaging and coupled to said stationary carrying body at one end thereof and engaging said one strip element at the other end thereof, said one strip element being supported on said stationary carrying body by said plurality of supporting elements, said supporting elements being structured and arranged so that a predetermined profile of a bending curve of said one strip element is provided irrespective of a bending of said stationary carrying body under load of said press shoe.

2. Press roll according to claim 1, wherein at least some of said plurality of supporting elements are selected from the group consisting of controllable hydraulic and pneumatic adjusting elements.

3. Press roll according to claim 2, wherein at least some of said plurality of supporting elements comprise one-direction fluid cylinders and spring elements biasing said fluid cylinders against the force exerted when pressurized.

4. Press roll according to claim 1, wherein at least some of said plurality of supporting elements comprise double-acting fluid cylinders.

5. Press roll according to claim 1, wherein said plurality of supporting elements comprise a plurality of spring elements arranged perpendicularly to said one strip element and having different spring constants and being structured and arranged so that a specific deflection of the roll under load, in order to adjust a predetermined profile of said bending curve of said one strip element is provided irrespective of a bending of said stationary carrying body under load of said press shoe.

6. Press roll according to claim 1, wherein at least some of said plurality of supporting elements comprise motor-driven servo-drives.

7. Press roll according to claim 1, wherein at least some of said plurality of supporting elements are connected with the carrying body by articulations.

8. Press roll according to claim 1, wherein said one strip element is subdivided axially into a plurality of strip element sections connected one to the other via articulations.

9. Press roll according to claim 1, wherein said press blanket revolves on a lubricant, and wherein said one strip element is arranged immediately adjacent said press shoe.

10. Press roll according to claim 9, wherein said one strip element comprises means for exhausting excessive lubricant.

11. Press roll according to claim 1, wherein said plurality of strip elements are arranged in the manner of a polygon along a circumference of said roll.

12. Press roll according to claim 11, further comprising means for coupling at least two of said plurality of strip elements for common movement.

13. Press roll according to claim 1, wherein each of said plurality of supporting elements supporting said one strip element comprises an extendable member that extends an associated distance irrespective of said bending of said stationary carrying body.

14. Press roll according to claim 1, wherein each of said plurality of supporting elements for said one strip element has members that support an associated portion of said one strip member, and extend and retract relative to each other irrespective of said bending of said stationary carrying body.

15. Press roll according to claim 1, wherein each of said plurality of supporting elements for said one strip element has members that extend and retract relative to each other such that said members substantially attain and maintain said predetermined profile of said one strip element irrespective of said bending of said stationary carrying body.

16. Press roll for a shoe press for extracting liquid from a pulp web passing through a press nip of a paper making machine, comprising:

a press shoe supported hydraulically on a stationary carrying body of said shoe press roll for taking up press forces in the nip, said stationary carrying body attaining a bend configuration under load of said press shoe;

a press blanket passing over said press shoe for supporting said pulp web;

a plurality of strip elements for supporting said press blanket, arranged outside said press nip and extending substantially in an axial direction of said roll; and a plurality of supporting elements coupled to at least one of said strip elements for supporting said one strip element said supporting elements engaging and coupled to said stationary carrying body at one end thereof and engaging said one strip element at the other end thereof, said one strip element being supported on said stationary carrying body by said plurality of supporting elements, said supporting elements being structured and arranged in a manner that enables said strip element to attain at least two substantially different predetermine profiles irrespective of said bend configuration of said stationary carrying body under said load of said press shoe.

* * * * *

UNITED STATES PATENT AND TRADEMARK OFFICE
CERTIFICATE OF CORRECTION

PATENT NO. : 5,645,691

DATED : July 8, 1997

INVENTOR(S) : Thomas Zuefle, Christian Schiel, and Karl Steiner

It is certified that error appears in the above-identified patent and that said Letters Patent is hereby corrected as shown below:

Claim 16, column 12, line 40, "predetermine" should be --predetermined--.

Signed and Sealed this

Twenty-seventh Day of October, 1998

Attest:

BRUCE LEHMAN

Attesting Officer

Commissioner of Patents and Trademarks